(12) United States Patent
Kimsey-Lin et al.

(10) Patent No.: US 11,258,787 B2
(45) Date of Patent: Feb. 22, 2022

(54) NETWORK REQUEST HANDLING BASED ON OPTICALLY-TRANSMITTED CODES

(71) Applicant: The Boeing Company, Chicago, IL (US)

(72) Inventors: Melanie L. Kimsey-Lin, Shoreline, WA (US); Kevin S. Callahan, Shoreline, WA (US)

(73) Assignee: THE BOEING COMPANY, Chicago, IL (US)

(*) Notice: Subject to any disclaimer, the term of this patent is extended or adjusted under 35 U.S.C. 154(b) by 486 days.

(21) Appl. No.: 15/727,210

(22) Filed: Oct. 6, 2017

(65) Prior Publication Data

US 2019/0109843 A1    Apr. 11, 2019

(51) Int. Cl.
*H04L 29/06* (2006.01)
*F21S 8/08* (2006.01)

(52) U.S. Cl.
CPC .......... *H04L 63/0853* (2013.01); *F21S 8/086* (2013.01); *H04L 63/0492* (2013.01); *H04L 63/08* (2013.01); *H04L 63/0892* (2013.01)

(58) Field of Classification Search
CPC ... H04L 9/3271; H04L 63/08; H04L 63/0853; H04L 63/10; H04L 63/107; H04L 63/0892; H04W 12/00; H04W 12/00503; H04W 12/00504; F21S 8/086
See application file for complete search history.

(56) References Cited

U.S. PATENT DOCUMENTS

| | | | |
|---|---|---|---|
| 9,654,222 B1* | 5/2017 | Shatz | G02B 19/0023 |
| 2013/0279697 A1 | 10/2013 | Garcia Morchon et al. | |
| 2014/0086590 A1* | 3/2014 | Ganick | G06Q 30/02 398/118 |
| 2014/0208387 A1* | 7/2014 | Ganesh | H04W 12/04 726/4 |
| 2015/0078757 A1* | 3/2015 | Pederson | H04B 10/116 398/118 |
| 2016/0352751 A1* | 12/2016 | Perrufel | H04L 63/0876 |
| 2017/0038787 A1* | 2/2017 | Baker | H05B 47/19 |
| 2017/0047994 A1* | 2/2017 | Logvinov | H04W 4/80 |
| 2017/0103647 A1* | 4/2017 | Davis | H04W 4/14 |
| 2017/0251365 A1* | 8/2017 | Burchardt | H04L 63/102 |

(Continued)

FOREIGN PATENT DOCUMENTS

WO    2007095740 A1    8/2007

OTHER PUBLICATIONS

Extended European Search Report dated Feb. 14, 2019 for corresponding PCT Application 18194621.1.

(Continued)

*Primary Examiner* — Jeremy S Duffield

(74) *Attorney, Agent, or Firm* — Coats & Bennett, PLLC

(57) ABSTRACT

A computing device determines whether or not to authorize a network request. In particular, responsive to the computing device receiving the network request from a mobile device, the computing device controls a plurality of light fixtures to each optically transmit a respective challenge code. The computing device approves or rejects the network request based respectively on whether or not a group of the challenge codes is received from the mobile device, each challenge code in the group being optically receivable at a location authorized for approving the network request.

20 Claims, 8 Drawing Sheets

(56) References Cited

U.S. PATENT DOCUMENTS

2017/0294130 A1* 10/2017 Donnelly ................ H04W 4/40
2018/0219869 A1*  8/2018 Kumar .................. H04W 12/12
2019/0223232 A1*  7/2019 Murakami ............ H04W 48/16

OTHER PUBLICATIONS

Bardsley et al. "Solid-State Lighting R&D Plan", Jun. 2016. pp. 1-208, U.S. Department of Energy, Energy Efficiency & Renewable Energy.

\* cited by examiner

NETWORK REQUEST HANDLING BASED ON OPTICALLY-TRANSMITTED CODES

TECHNICAL FIELD

The present disclosure generally relates to determining whether or not to authorize network requests received from mobile devices, and more particularly relates to controlling light fixtures to transmit codes that a mobile device uses to have a network request approved.

BACKGROUND

Network nodes commonly receive network requests from a wide variety of devices. For example, a network node may receive a request from a remote computer requesting a particular network service or access to a particular network. In some networks, a particular network node is responsible for determining whether to approve or reject such network requests.

SUMMARY

Various aspects of the present disclosure generally relate to methods, computing devices, systems, computer readable media, computer program products, carriers, signals, hardware and/or software that determines whether or not to authorize a network request.

Particular aspects include a computing device comprising interface circuitry and processing circuitry. The interface circuitry is configured to exchange signals with a plurality of light fixtures and a mobile device. The processing circuitry is communicatively coupled to the interface circuitry and configured to, responsive to receiving, via the interface circuitry, a network request from the mobile device, control, via the interface circuitry, the plurality of light fixtures to each optically transmit a respective challenge code. The processing circuitry is further configured to approve or reject the network request based respectively on whether or not a group of the challenge codes is received from the mobile device via the interface circuitry, each challenge code in the group being optically receivable at a location authorized for approving the network request.

In some aspects, the network request is a request to gain access to an in-vehicle network.

In some aspects, the network request is a request to control a device at, or substantially near, the location authorized for approving the network request.

In some aspects, the processing circuitry is further configured to, in response to approving the network request, track movement of the mobile device relative to the plurality of light fixtures. To track the movement of the mobile device, the processing circuitry is configured to receive, via the interface circuitry, different groups of challenge codes transmitted by the plurality of light fixtures at different times, and for each group received, determine a corresponding location of the mobile device from the challenge codes in the group. In some such aspects, the processing circuitry is further configured to control, via the interface circuitry, a lighting system comprising the plurality of light fixtures to illuminate the determined locations of the mobile device as the movement of the mobile device is tracked. In particular of such aspects, the lighting system is comprised within a vehicle, and to track movement of the mobile device relative to the plurality of light fixtures, the processing circuitry is configured to track movement of the mobile device within the vehicle.

In some aspects, the processing circuitry is configured to approve or reject the network request further based respectively on whether or not the mobile device is recognized as a trusted device.

In some aspects, to control the plurality of light fixtures to each optically transmit, the processing circuitry is configured to control the plurality of light fixtures to each optically transmit using pulse-width modulation at or above a flicker fusion threshold.

In some aspects, the processing circuitry is further configured to notify a user, via the interface circuitry, that the mobile device is at the location authorized for approving the network request.

Other aspects include a method, implemented in a computing device, for determining whether or not to authorize a network request. The method comprises, responsive to receiving the network request from a mobile device, controlling a plurality of light fixtures to each optically transmit a respective challenge code. The method further comprises approving or rejecting the network request based respectively on whether or not a group of the challenge codes is received from the mobile device, each challenge code in the group being optically receivable at a location authorized for approving the network request.

In some aspects, the network request is a request to gain access to an in-vehicle network.

In some aspects, the network request is a request to control a device at, or substantially near, the location authorized for approving the network request.

In some aspects, the method further comprises, in response to approving the network request, tracking movement of the mobile device relative to the plurality of light fixtures. The tracking comprises receiving different groups of challenge codes transmitted by the plurality of light fixtures at different times, and for each group received, determining a corresponding location of the mobile device from the challenge codes in the group. In some such aspects, the method further comprises controlling a lighting system comprising the plurality of light fixtures to illuminate the determined locations of the mobile device as the movement of the mobile device is tracked. In particular of such aspects, the lighting system is comprised within a vehicle, and tracking movement of the mobile device relative to the plurality of light fixtures comprises tracking movement of the mobile device within the vehicle.

In some aspects, approving or rejecting the network request is further based respectively on whether or not the mobile device is recognized as a trusted device.

In some aspects, controlling the plurality of light fixtures to each optically transmit comprises controlling the plurality of light fixtures to each optically transmit using pulse-width modulation at or above a flicker fusion threshold.

In some aspects, the method further comprises notifying a user that the mobile device is at the location authorized for approving the network request.

Other aspects include a non-transitory computer readable medium storing a computer program product for controlling a programmable computing device. The computer program product comprises software instructions that, when run on processing circuitry of the programmable computing device, cause the programmable computing device to perform any of the aspects described herein.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of a light fixture 120, generally, as opposed to discussion of particular instances of light fixtures 120a, 120b).

DETAILED DESCRIPTION

Aspects of the present disclosure are directed to methods, computing devices, systems, computer readable media, computer program products, carriers, signals, hardware and/or software that determines whether or not to authorize a network request.

Figure 1:
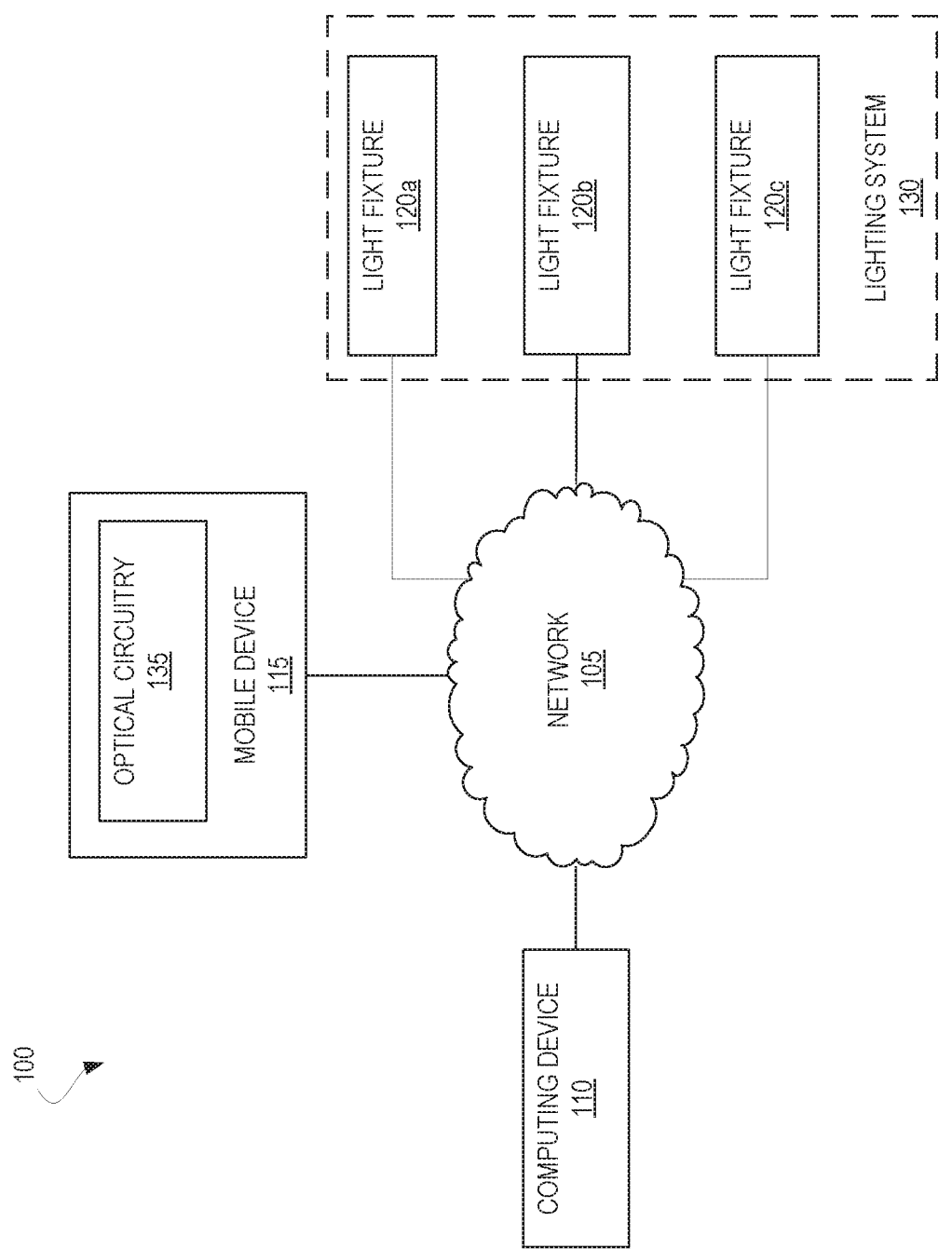
FIG. 1 is a block diagram of an example network environment, according to one or more aspects of the present disclosure.

FIG. 1 illustrates an example network environment 100 according to one or more such aspects. The example network environment 100 includes a computing device 110, a mobile device 115, a plurality of light fixtures 120a-c, and a network 105. As will be discussed in greater detail below, the computing device 110 receives a network request from the mobile device 115, and in response, controls the light fixtures 120a-c to each optically transmit a respective challenge code. The mobile device 115 detects one or more of the challenge codes, and transmits the detected challenge codes to the computing device 110. The computing device 110 approves or rejects the network request based respectively on whether or not a particular group of the challenge codes is received from the mobile device 115. Specifically, the computing device 110 approves the network request if each challenge code in the group is optically receivable at a location authorized for approving the network request. Otherwise, the computing device 110 rejects the network request. Thus, the computing device 110 approves the network request in response to the mobile device 115 being at a location authorized for that request, as evidenced by the mobile device 115 returning codes that are receivable from the authorized location.

According to particular aspects, any or all of the network environment 100 may be comprised within a vehicle and/or structure (not shown). In at least some aspects that include a vehicle, the vehicle is capable of being manned. In at least some aspects that include a vehicle, the vehicle is capable of operating unmanned. According to particular aspects herein, the vehicle is an aircraft, spacecraft, rotorcraft, satellite, rocket, terrestrial vehicle, surface water borne vehicle, sub-surface water borne vehicle, subterranean vehicle, or any combination thereof. In at least some of the aspects that include a structure, the structure is designed to house, store, and/or dock one or more such vehicles. In some aspects, the structure is a residential, commercial, and/or industrial building.

The network 105 includes one or more physical devices and/or signaling mediums capable of exchanging communication signals between the computing device 110, mobile device 115, and light fixtures 120a-c. Examples of such a network 105 include (but are not limited to) one or more signaling mediums; one or more in-vehicle networks (e.g., of an aircraft, spacecraft, rotorcraft, ship, one or more local area networks; one or more wireless networks; one or more Internet Protocol-based networks; one or more Ethernet networks; one or more optical networks; one or more ad hoc networks; and/or one or more electrical buses. Such a network 105 may comprise any number of networking devices such as routers, gateways, switches, hubs, firewalls, multiplexers, controllers, and the like (not shown), supporting the exchange of such communication signals.

The light fixtures 120a-c each provide electrical power to one or more solid state light sources, each of which may be of any type, including (but not limited to) light emitting diode (LED), quantum dot LED, and/or organic LED-based lighting. Each of the light fixtures 120a-c is also configured to be controllable to optically transmit, by appropriate signaling from the computing device 110, using its corresponding light source. In some aspects, one or more of the light fixtures 120a-c may be comprised in one or more lighting systems 130. Such a lighting system 130 may include one or more intermediate devices (not shown) through which control signaling is exchanged with the computing device 110 for controlling the light fixture(s) 120 in the lighting system 130. According to particular aspects, any or all of the lighting systems 130 in the network environment 100 may be comprised within a vehicle and/or structure. For example, in some aspects, the lighting system 130 includes a cabin lighting system of an aircraft, a deck lighting system of a ship, and/or an interior lighting system of an airport facility. Other aspects may include other kinds of lighting systems 130. Although three light fixtures 120a-c are illustrated in FIG. 1, other aspects may include additional or fewer light fixtures 120.

The computing device 110 may be any computing platform capable of exchanging signaling with one or more other devices in the network environment 100. Examples of the computing device 110 include (but are not limited to) a server computer, a workstation, a personal computer, a network router, a network gateway, and/or a network access point.

The mobile device 115 may be any computing device that may be operated without a wired connection to an external power source, is capable of wireless communication with one or more other devices in the network environment 100, and comprises optical circuitry 135 (e.g., a charge-coupled device and/or complementary metal-oxide semiconductor) configured to detect a challenge code optically transmitted from one or more of the light fixtures 120a-c. Examples of the mobile device 115 include (but are not limited to) a smartphone, a laptop, a tablet computer, and/or a wearable computer.

Figure 2A:
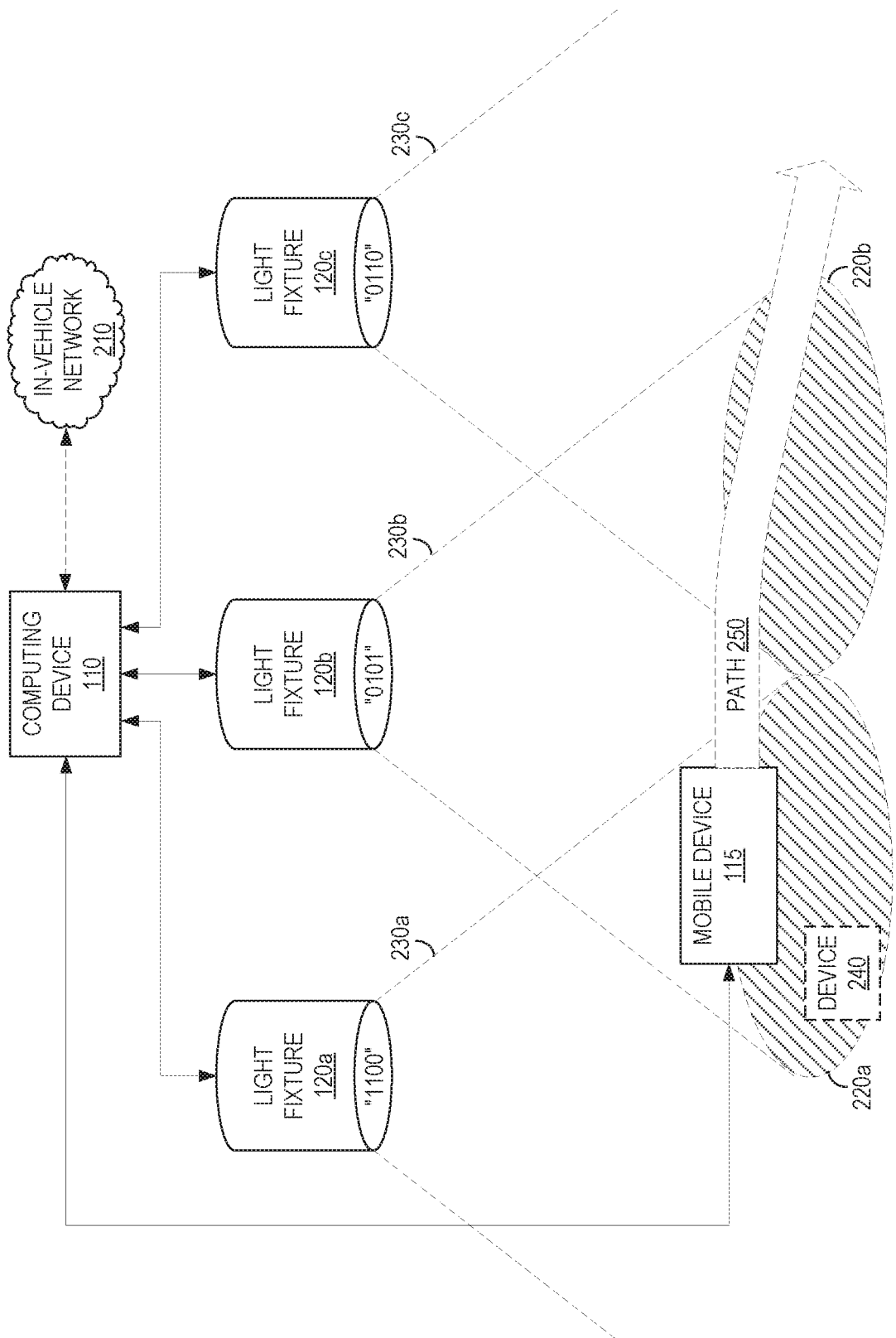
FIGS. 2A-2D are block diagrams illustrating examples in which light fixtures optically transmit light that is receivable from respective locations, according to one or more aspects of the present disclosure.

FIG. 2A illustrates an example in which light fixtures 120a-c each optically transmit light 230a-c, respectively, that is receivable from respective locations. In particular, at location 220a, light 230a-b respectively transmitted from light fixtures 120a-b is receivable, e.g., due to a line of sight from the location 220a to each of the light fixtures 120a-b. Similarly, light 230b-c respectively transmitted from light fixtures 120b-c is receivable at location 220b. According to this example, outside of the locations 220*a-b*, light 230*a-c* is receivable from only one of the light fixtures 120*a-c*, if any at all.

According to this example, the mobile device 115 is at location 220*a* and transmits a network request to the computing device 110. Various aspects of the network request may take various forms. For example, in some aspects, the network request includes a request to gain access to an in-vehicle network 210 and/or other network such as the Internet (not shown). In yet another example, the network request includes a request to control a device 240 at location 220*a*, the location 220*a* being an authorized location for approving such a network request. Other examples include other requests of the network, including (but not limited to) requests for one or more particular network resources, such as a service, device, bandwidth, processing time, and/or spectrum.

Other examples also include a request to control a device 240 substantially near the location 220*a*. According to one such example, the device 240 may be attached to, abutting, or connected to the opposite side of a surface bordering the location 220*a*. According to another such example, the device 240 may share a housing or compartment with one or more of the light fixtures 120*a-c*.

Responsive to receiving the request from the mobile device 115, the computing device 110 controls a plurality of light fixtures 120*a-c* to each optically transmit a respective challenge code. According to this example, the computing device 110 controls light fixture 120*a* to optically transmit the challenge code "1100." The computing device 110 further controls light fixture 120*b* to optically transmit the challenge code "0101." Further, the computing device 110 controls light fixture 120*c* to optically transmit the challenge code "0110." In some aspects, the challenge codes may be determined by the computing device 110 based on the network request.

Other examples include challenge codes that are different from those shown in the present example, and may be of different lengths and/or take any of a variety of signaling forms that are appropriate for optical transmission. For example, in a particular aspect, controlling the plurality of light fixtures 120*a-c* to each optically transmit comprises controlling the plurality of light fixtures 120*a-c* to each optically transmit using pulse-width modulation at or above a flicker fusion threshold, e.g., so that the optical transmissions are not detectable to the human eye despite being transmitted within the visible light spectrum.

From location 220*a*, the mobile device 115 is able to receive optical transmissions from light fixtures 120*a-b*, and is not able to receive optical transmissions from light fixture 120*c*. Accordingly, in this example, the mobile device 115 receives challenge codes "1100" and "0101" (e.g., via optical circuitry of the mobile device 115), and transmits the received challenge codes as a group of challenge codes to the computing device 110 (e.g., via radio circuitry of the mobile device 115). Challenge code "0110" is not received by the mobile device 115, at least because this code is not optically receivable from location 220*a*. Accordingly, the mobile device 115 does not transmit challenge code "0110" in the group of challenge codes to the computing device 110.

To be clear, a group of challenge codes, for purposes of this disclosure, is to be interpreted as those challenge codes transmitted or received as part of the same request or response using one or more messages and/or signaling packets. The computing device 110 approves or rejects the network request based respectively on whether or not a group of the challenge codes is received from the mobile device 115, each challenge code in the group being optically receivable at a location 220 authorized for approving the network request. For example, location 220*a* may be a location authorized for approving network requests to control device 240. In such an example, the computing device 110 approves or rejects the network request based respectively on whether or not a group of the challenge codes is received from the mobile device 115, each of which is optically receivable at location 220*a*.

In the example of FIG. 2A, the computing device 110 receives a group of challenge codes including "1100" and "0101," each of which is optically receivable at location 220*a*, and location 220*a* is a location authorized for approving the request. Accordingly, the computing device 110 approves the network request.

Had the computing device 110 instead received a group of challenge codes that included the challenge code "0110" transmitted by light fixture 120*c* (e.g., in another aspect), the computing device would have rejected the network request instead of approving it, since challenge code "0110" is not optically receivable at location 220*a* (which is the location 220*a* authorized for approving the network request in the example of FIG. 2A). Rather, the ability of the mobile device 115 to detect and transmit challenge code "0110" implies that the mobile device is outside of location 220*a*, and is instead somewhere that is able to optically receive the light 230*c* transmitted by light fixture 120*c*, such as location 220*b*. The computing device 110 would have also rejected the network request had the computing device 110 received either one or none of the challenge codes optically receivable from location 220*a*, according to other examples.

Note that in some aspects, the computing device 110 may approve or reject the network request based respectively on whether or not additional criteria are also met. For example, in a particular aspect, approving or rejecting the network request is further based respectively on whether or not the mobile device is recognized as a trusted device. Other aspects additionally or alternatively include consideration of other criteria.

In view of the above, the computing device 110 approves the network request in at least some aspects. In some such aspects, the computing device 110 tracks movement of the mobile device 115 relative to the plurality of light fixtures 120*a-c*. For example, in an aspect, the mobile device 115 moves according to a path 250 from one location 220*a* to another location 220*b*. To track movement of the mobile device 115 relative to the plurality of light fixtures 120*a-c*, the computing device 110 receives different groups of challenge codes transmitted by the plurality of light fixtures 120*a-c* at different times, and for each group received, determines a corresponding location 220*a-b* of the mobile device from the challenge codes in the group.

According to a particular aspect in which the plurality of light fixtures 120*a-c* are part of a lighting system 130 comprised in a vehicle, tracking movement of the mobile device 115 relative to the plurality of light fixtures 120*a-c* comprises tracking movement of the mobile device 115 within the vehicle (e.g., as the mobile device 115 moves throughout the cabin of an aircraft or train).

Additionally or alternatively, the computing device 110 may, in some aspects, notify a user that the mobile device 115 is at a location 220 authorized for approving a particular network request. For example, responsive to determining that the mobile device 115 is at location 220*a*, the computing device 110 may notify a user (e.g., via text message or other signaling) that the mobile device 115 is at a location authorized for approving access to (e.g., control of) device 240.

Figure 2B:
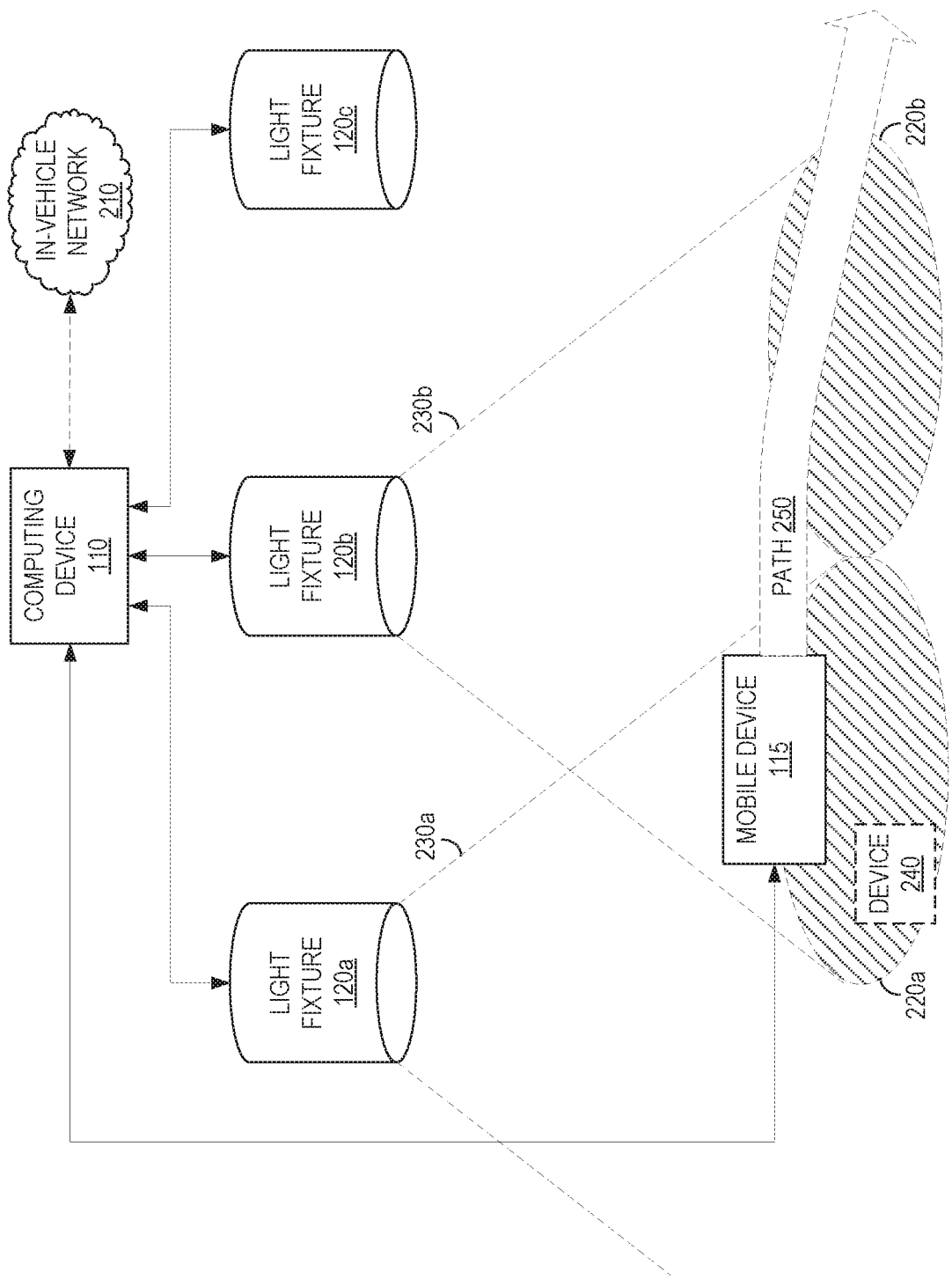

Further, according to particular aspects, the computing device may additionally or alternatively control the plurality of light fixtures 120a-c (via one or more lighting systems 130, in some aspects) to illuminate the determined locations 220a-b of the mobile device 115 as the movement of the mobile device 115 is tracked. For example, the computing device 110 may receive, from the mobile device 115, challenge codes "1100" and "0101" that were respectively transmitted from light fixtures 120a-b (e.g., under the control of the computing device 110) at a first time instance. The computing device 110 may determine from these received challenge codes that the mobile device 115 is within location 220a, and may correspondingly control light fixtures 120a-b to illuminate, and/or control light fixture 120c to extinguish, as shown in FIG. 2B.

Figure 2C:
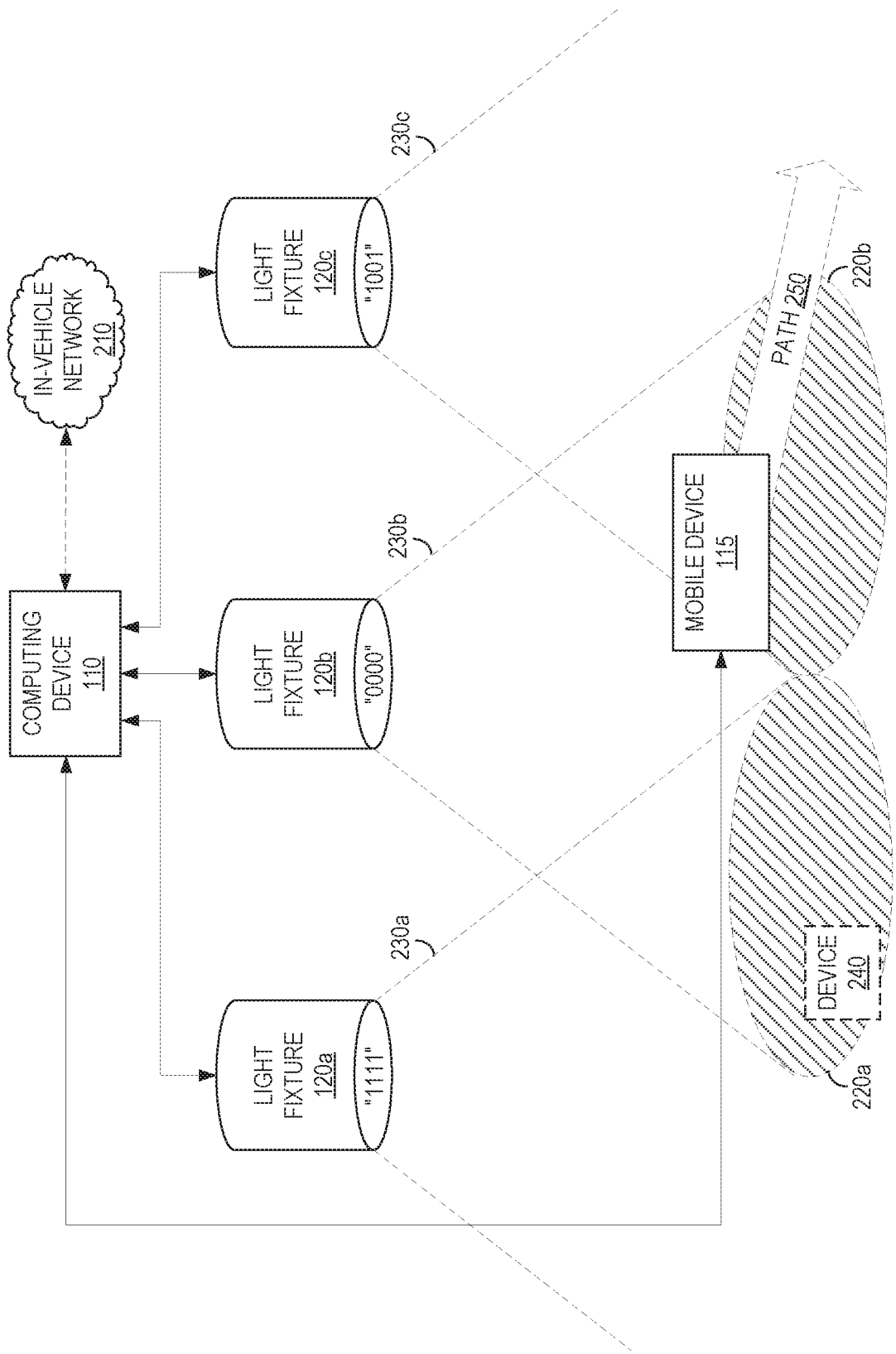

Subsequently, the mobile device 115 may progress along the path 250, leaving location 220a and entering location 220b, as shown in FIG. 2C. The computing device 110 may then receive, from the mobile device 115, challenge codes "0000" and "1001" that were respectively transmitted from light fixtures 120b-c (e.g., under the control of the computing device 110) at a second time instance. Challenge code "1111" transmitted by light fixture 120a, not being optically receivable at location 220b, is not received by mobile device 115, and is correspondingly not included along with challenge codes "0000" and "1001" in the group of challenge codes transmitted to the computing device 110.

Figure 2D:
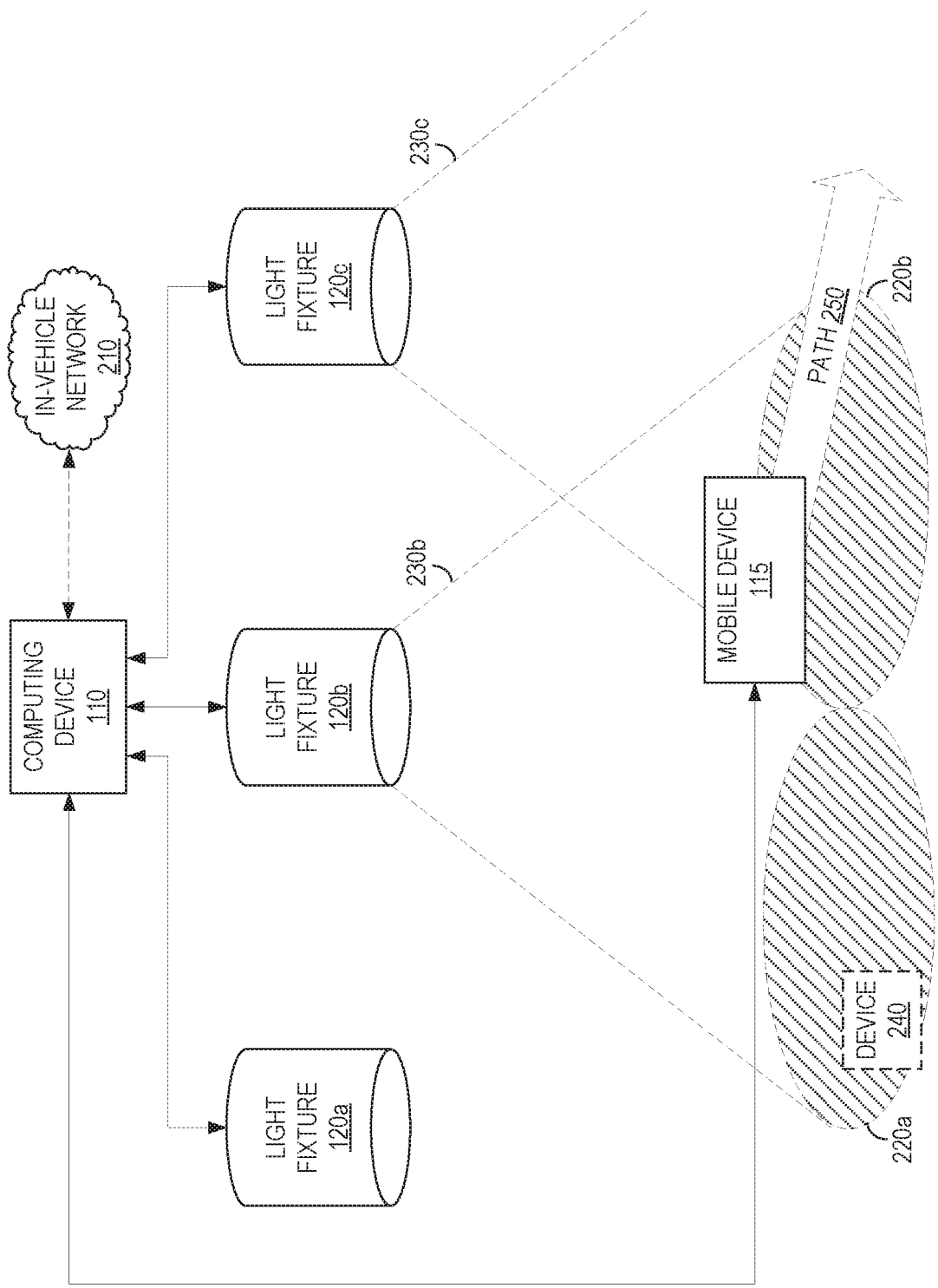
Figure 3:
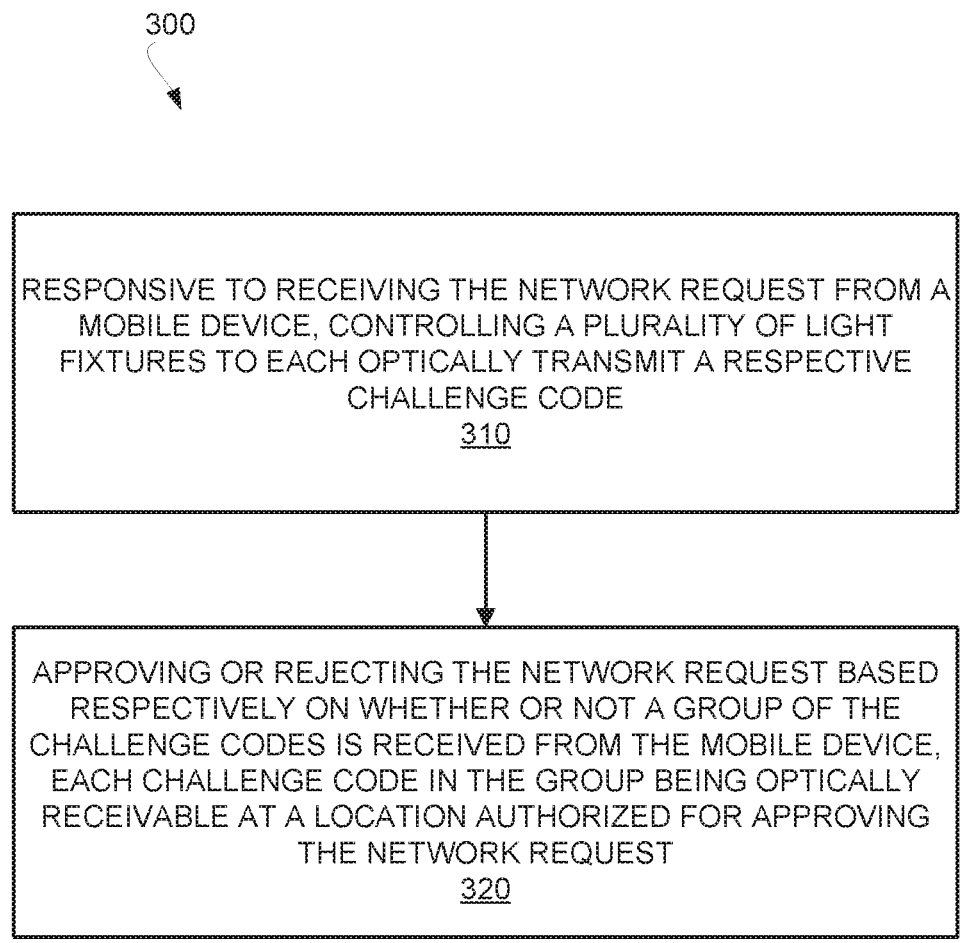
FIG. 3 is a flow diagram illustrating an example method, according to one or more aspects of the present disclosure.
Figure 4:
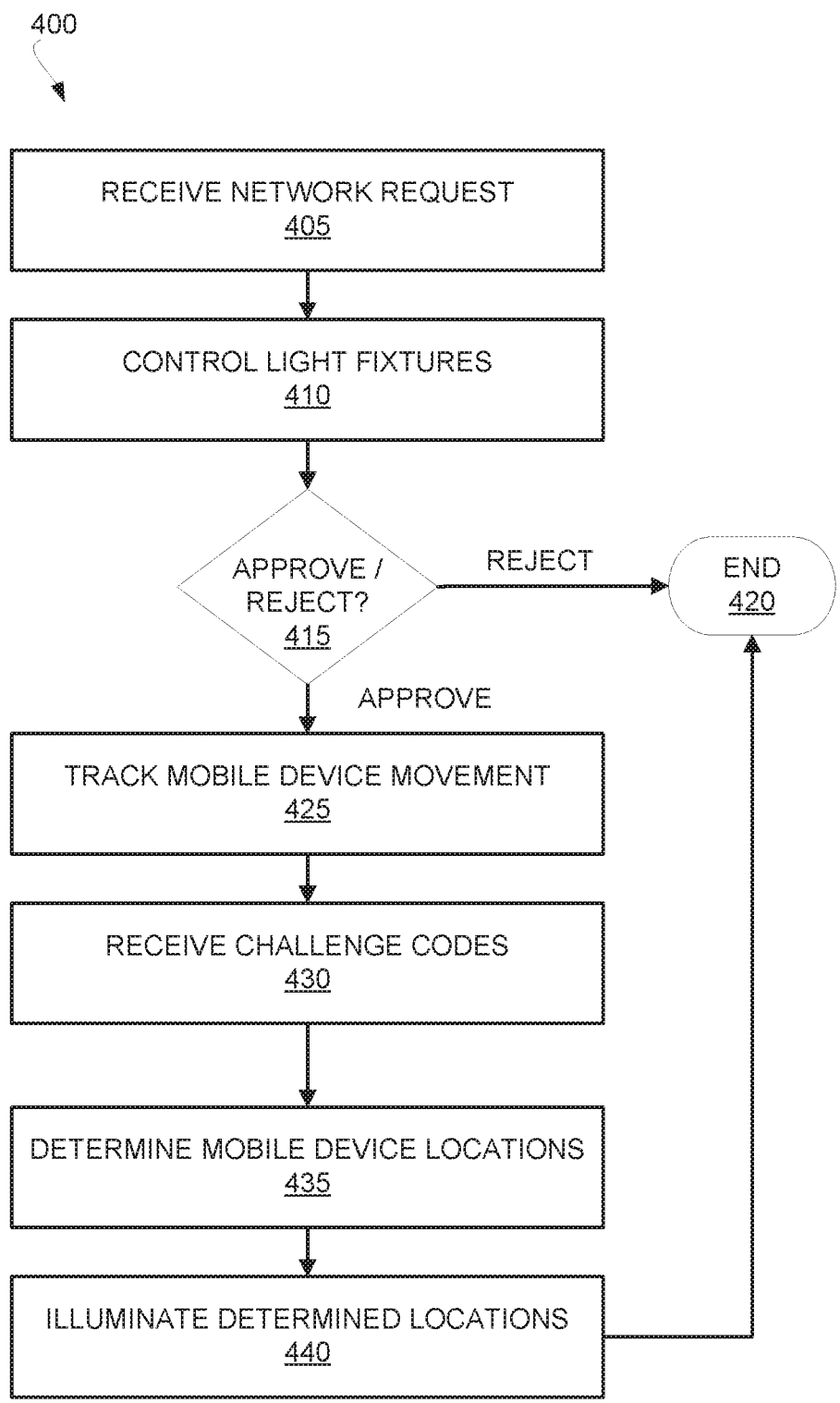
FIG. 4 is a flow diagram illustrating a more detailed example method, according to one or more aspects of the present disclosure.

The computing device 110 may determine from these subsequently received challenge codes "0000" and "1001" that the mobile device 115 is now at location 220b, and may correspondingly control light fixture 120a to extinguish and/or control light fixtures 120b-c to illuminate, as shown in FIG. 2D. Thus, the visible light emitted from the plurality of light fixtures 120a-c may, in some aspects, appear to follow the movement of the mobile device 115 along the path 250. In support of tracking the mobile device 115, the computing device 110 may control the light fixtures 120a-c to optically transmit challenge codes periodically, and may additionally or alternatively change the challenge codes, e.g., to prevent the mobile device 115 from learning the challenge codes and attempting to misrepresent where it is located.

In view of the above, aspects of the present disclosure include a method 300, implemented by a computing device 110, of determining whether or not to authorize a network request. The method 300 comprises, responsive to receiving the network request from a mobile device 115, controlling a plurality of light fixtures 120a-c to each optically transmit a respective challenge code (block 310). The method 300 further comprises approving or rejecting the network request based respectively on whether or not a group of the challenge codes is received from the mobile device 115, each challenge code in the group being optically receivable at a location 220 authorized for approving the network request (block 320).

Aspects of the present disclosure include a more detailed method 400, implemented by a computing device 110. The method 400 comprises receiving a network request from a mobile device 115 (block 405). In some aspects, the network request includes a request to gain access to an in-vehicle network and/or a request to control a device 240 at, or substantially near, the location 220a authorized for approving the network request.

The method 400 further comprises controlling a plurality of light fixtures 120a-c to each optically transmit a respective challenge code (block 410). In some aspects, controlling the plurality of light fixtures 120a-c to each optically transmit comprises controlling the plurality of light fixtures 120a-c to each optically transmit using pulse-width modulation at or above a flicker fusion threshold.

The method 400 further comprises approving or rejecting the network request based respectively on whether or not a group of the challenge codes is received from the mobile device 115, each challenge code in the group being optically receivable at a location 220a authorized for approving the network request (block 415). In some aspects, approving or rejecting the network request is further based respectively on whether or not the mobile device 115 is recognized as a trusted device. In response to rejecting the network request (block 415, reject), the method 400 ends (block 420).

The method 400 further comprises, in response to approving the network request (block 415, approve), tracking movement of the mobile device 115 relative to the plurality of light fixtures 120a-c (block 425). The tracking comprises receiving different groups of challenge codes transmitted by the plurality of light fixtures 120a-c at different times (block 430), and for each group received, determining a corresponding location 220 of the mobile device 115 from the challenge codes in the group (block 435). In some aspects, the plurality of light fixtures 120a-c are comprised in a lighting system 130 comprised within a vehicle, and tracking movement of the mobile device 115 relative to the plurality of light fixtures 120a-c comprises tracking movement of the mobile device 115 within the vehicle.

The method 400 further comprises controlling a lighting system 130 comprising the plurality of light fixtures 120a-c to illuminate the determined locations 220 of the mobile device 115 as the movement of the mobile device 115 is tracked (block 440). The method 400 then ends (block 420).

Figure 5:
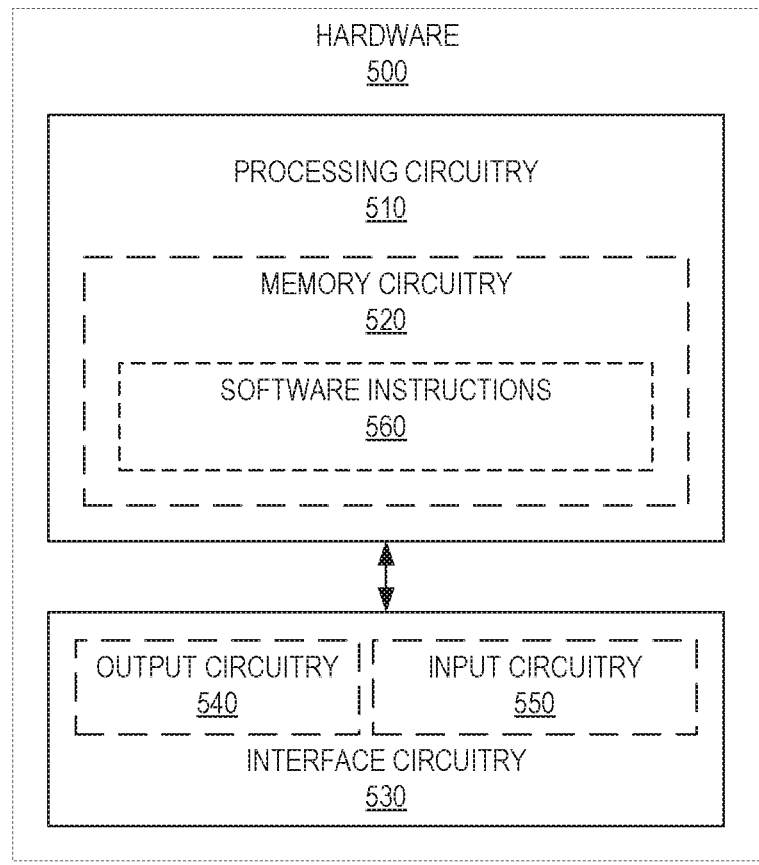
FIG. 5 is a block diagram illustrating example hardware, according to one or more aspects of the present disclosure.

Other aspects of the present disclosure include a computing device 110, light fixture 120, and/or mobile device 115 implemented according to the example hardware 500 illustrated in FIG. 5. The hardware 500 comprises processing circuitry 510 and interface circuitry 530, which are communicatively coupled to each other, e.g., via one or more buses. The processing circuitry 510 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 510 may be programmable hardware capable of executing software instructions 560 stored as a machine-readable computer program in memory circuitry 520 of the processing circuitry 510.

The memory circuitry 520 of the various aspects may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 530 may be a controller hub configured to control the input and output (I/O) data paths of the hardware 500. Such I/O data paths may include data paths for exchanging signals over a communications network 105 and/or data paths for exchanging signals with a user. For example, the interface circuitry 530 may comprise a transceiver configured to send and receive communication signals over one or more of a wireless medium, wired medium, electrical medium, electromagnetic medium, and/or optical medium. The interface circuitry 530 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 530 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 530 may be implemented as a unitary physical component, or as a plurality of physical components that are contiguously or separately arranged, any of which may be communicatively coupled to any other, or may communicate with any other via the processing circuitry 510. For example, the interface circuitry 530 may comprise output circuitry 540 (e.g., transmitter circuitry configured to send communication signals over the communications network 105) and input circuitry 550 (e.g., receiver circuitry configured to receive communication signals over the communications network 105). Similarly, the output circuitry 540 may comprise a display, whereas the input circuitry 550 may comprise a keyboard. Other examples, permutations, and arrangements of the above and their equivalents are included according to various aspects of the present disclosure.

According to particular aspects of the hardware 500 illustrated in FIG. 5, the interface circuitry 530 is configured to exchange signals with a plurality of light fixtures 120a-c and a mobile device 115. The processing circuitry 510 is configured to, responsive to receiving, via the interface circuitry 530, a network request from the mobile device 115, control, via the interface circuitry 530, the plurality of light fixtures 120a-c to each optically transmit a respective challenge code. The processing circuitry 510 is further configured to approve or reject the network request based respectively on whether or not a group of the challenge codes is received from the mobile device 115 via the interface circuitry 530, each challenge code in the group being optically receivable at a location authorized for approving the network request. The hardware 500 may additionally or alternatively be configured to perform any of the methods and/or functions described herein, according to various aspects.

According to particular aspects, the hardware 500 may be configured with a plurality of components. These components may include a plurality of communicatively coupled hardware units and/or software modules. One or more of the hardware units may be comprised in the processing circuitry 510 and/or interface circuitry 530. One or more of the software modules may be stored in the memory circuitry 520 and executed by the processing circuitry 510.

Figure 6:
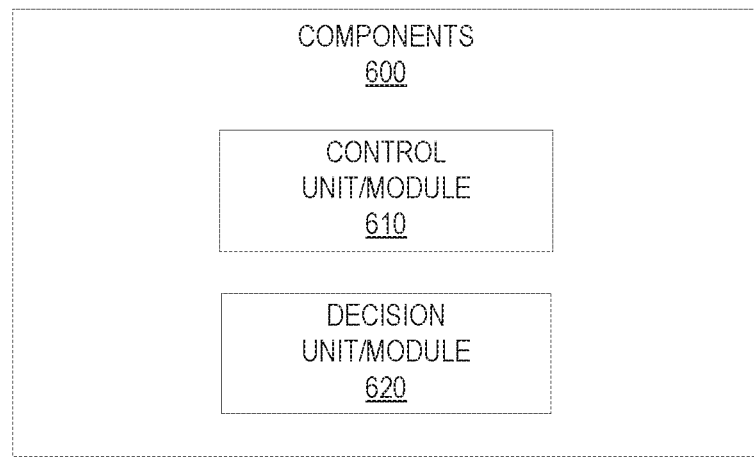
FIG. 6 is a block diagram illustrating example components, according to one or more aspects of the present disclosure.

For example, the hardware 500 may be comprised in the computing device 110 and configured with the example components 600 illustrated in FIG. 6. The components 600 include a control unit and/or module 610 and a decision unit and/or module 620. According to this example, the control unit and/or module 610 is configured to, responsive to receiving a network request from a mobile device 115, control a plurality of light fixtures 120a-c to each optically transmit a respective challenge code. Further, the decision unit and/or module 620 is configured to approve or reject the network request based respectively on whether or not a group of the challenge codes is received from the mobile device 115, each challenge code in the group being optically receivable at a location 220 authorized for approving the network request. The hardware 500 may additionally or alternatively comprise further units and/or modules configured to perform any of the methods and/or functions described herein, according to various aspects.

Further aspects of the present disclosure a non-transitory computer readable medium (e.g., memory circuitry 520) storing a computer program product for controlling a programmable computing device 110. The computer program product comprises software instructions 560 that, when run on the programmable computing device 110, cause the programmable computing device 110 to perform any of the methods and/or functions described herein.

The present invention may, of course, be carried out in other ways than those specifically set forth herein without departing from essential characteristics of the invention. The present aspects are to be considered in all respects as illustrative and not restrictive, and all changes coming within the meaning and equivalency range of the appended claims are intended to be embraced therein.

What is claimed is:

1. A computing device comprising:
    interface circuitry configured to exchange signals with a plurality of light fixtures and a mobile device;
    processing circuitry communicatively coupled to the interface circuitry and configured to:
        responsive to receiving, via the interface circuitry, a network request from the mobile device, control, via the interface circuitry, the plurality of light fixtures to each optically transmit a respective challenge code with the challenge codes different from one another and transmitted concurrently, the network request comprising a first request to gain access to a network and a second request to activate a first device that is separate from the plurality of light fixtures and the first device is positioned at a location authorized for approving the network request;
        either approve or reject the network request based on a received response, the determination of approving or rejecting the network request based on:
        approve the network request upon receiving a minimum of at least two of the challenge codes from the mobile device, each of the received challenge codes being optically receivable at the location authorized for approving the network request; and
        reject the network request upon receiving one or more of the challenge codes from the mobile device that is not configured to be optically receivable at the authorized location and after rejecting the network request determining a location of the mobile device that is away from the authorized location based on the received one or more challenge codes.

2. The computing device of claim 1, wherein the network request is a request to gain access to an in-vehicle network.

3. The computing device of claim 1, wherein:
    the processing circuitry is further configured to, in response to approving the network request, track movement of the mobile device relative to the plurality of light fixtures;
    to track the movement of the mobile device, the processing circuitry is configured to receive, via the interface circuitry, different groups of challenge codes transmitted by the plurality of light fixtures at different times, and for each group received, determine a corresponding location of the mobile device from the challenge codes in the group.

4. The computing device of claim 3, wherein the processing circuitry is further configured to control, via the interface circuitry, a lighting system comprising the plurality of light fixtures to illuminate the determined locations of the mobile device as the movement of the mobile device is tracked.

5. The computing device of claim 4, wherein the lighting system is comprised within a vehicle, and to track movement of the mobile device relative to the plurality of light fixtures, the processing circuitry is configured to track movement of the mobile device within the vehicle.

6. The computing device of claim 1, wherein the processing circuitry is configured to approve or reject the network request further based respectively on whether or not the mobile device is recognized as a trusted device.

7. The computing device of claim 1, wherein to control the plurality of light fixtures to each optically transmit, the processing circuitry is configured to control the plurality of light fixtures to each optically transmit using pulse-width modulation at or above a flicker fusion threshold.

8. The computing device of claim 1, wherein the processing circuitry is further configured to notify a user, via the interface circuitry, that the mobile device is at the location authorized for approving the network request.

9. A method, implemented in a computing device, of determining whether or not to authorize a network request, the method comprising:
  responsive to receiving the network request from a mobile device that comprises a first request to gain access to a network and a second request to active a first device, controlling a plurality of light fixtures to each optically transmit a respective challenge code with each of the challenge codes different from one another;
  either approve or reject the network request based on a received response, the determination of approving or rejecting the network request based on:
    approve the network request upon receiving a minimum of at least two of the challenge codes from the mobile device, each of the received challenge codes being optically receivable at a location authorized for approving the network request; and
    reject the network request upon receiving one or more of the challenge codes from the mobile device that is not configured to be optically receivable at the authorized location and after rejecting the network request determining a location of the mobile device that is away from the authorized location based on the received one or more challenge codes;
  the first device being located in proximity to the plurality of light fixtures and is separate from the light fixtures.

10. The method of claim 9, wherein the network request is a request to gain access to an in-vehicle network.

11. The method of claim 9, further comprising, in response to approving the network request, tracking movement of the mobile device relative to the plurality of light fixtures, the tracking comprising receiving different groups of challenge codes transmitted by the plurality of light fixtures at different times, and for each group received, determining a corresponding location of the mobile device from the challenge codes in the group.

12. The method of claim 11, further comprising controlling a lighting system comprising the plurality of light fixtures to illuminate the determined locations of the mobile device as the movement of the mobile device is tracked.

13. The method of claim 12, wherein the lighting system is comprised within a vehicle, and tracking movement of the mobile device relative to the plurality of light fixtures comprises tracking movement of the mobile device within the vehicle.

14. The method of claim 9, wherein approving or rejecting the network request is further based respectively on whether or not the mobile device is recognized as a trusted device.

15. The method of claim 9, wherein controlling the plurality of light fixtures to each optically transmit comprises controlling the plurality of light fixtures to each optically transmit using pulse-width modulation at or above a flicker fusion threshold.

16. The method of claim 9, further comprising notifying a user that the mobile device is at the location authorized for approving the network request.

17. A non-transitory computer readable medium storing a computer program product for controlling a programmable computing device, the computer program product comprising software instructions that, when run on processing circuitry of the programmable computing device, cause the programmable computing device to:
  receiving a network request from a mobile device, the network request comprising a first request to gain access to a network and a second request to activate a first device;
  responsive to receiving the network request from the mobile device, control a plurality of light fixtures to each optically transmit a respective challenge code with each of the challenge codes is different;
  either approve or reject the network request based on a received response, the determination of approving or rejecting the network request based on:
  approve the network request upon receiving a minimum of at least two of the challenge codes from the mobile device, each of the received challenge codes being optically receivable at a location authorized for approving the network request;
  reject the network request upon receiving one or more of the challenge codes from the mobile device that is not configured to be optically receivable at the authorized location and after rejecting the network request determining a location of the mobile device that is away from the authorized location based on the received one or more challenge codes;
  the first device being located in proximity to the plurality of light fixtures and is separate from the light fixtures.

18. The non-transitory computer readable medium of claim 17, further comprising the software instructions cause the programmable computing device to track movement of the mobile device relative to the plurality of light fixtures.

19. The computing device of claim 1, wherein the processing circuitry is further configured to track a location of the mobile device and to extinguish one or more of the plurality of light fixtures based respectively on received challenge codes.

20. The method of claim 9, further comprising tracking the movement of the mobile device based on the received challenge codes and illuminating or extinguishing the plurality of light fixtures based on a corresponding location of the mobile device.

* * * * *